United States Patent
Özümüztoprak et al.

(10) Patent No.: US 11,683,668 B2
(45) Date of Patent: Jun. 20, 2023

(54) SYSTEM FOR SENDING SHORT MESSAGE OVER A SECOND NUMBER

(71) Applicant: TURKCELL TEKNOLOJI ARASTIRMA VE GELISTIRME ANONIM SIRKETI, Istanbul (TR)

(72) Inventors: Esra Özlem Özümüztoprak, Kocaeli (TR); Koray Vatansever, Kocaeli (TR)

(73) Assignee: TURKCELL TEKNOLOJI ARASTIRMA VE GELISTIRME ANONIM SIRKETI, Istanbul (TR)

( * ) Notice: Subject to any disclaimer, the term of this patent is extended or adjusted under 35 U.S.C. 154(b) by 188 days.

(21) Appl. No.: 17/418,666

(22) PCT Filed: Dec. 24, 2019

(86) PCT No.: PCT/TR2019/051190
§ 371 (c)(1),
(2) Date: Jun. 25, 2021

(87) PCT Pub. No.: WO2020/139288
PCT Pub. Date: Jul. 2, 2020

(65) Prior Publication Data
US 2022/0086606 A1    Mar. 17, 2022

(30) Foreign Application Priority Data
Dec. 25, 2018 (TR) .................. 2018/20342

(51) Int. Cl.
*H04W 4/14* (2009.01)
*H04W 8/18* (2009.01)
*H04W 80/04* (2009.01)
*H04W 80/10* (2009.01)

(52) U.S. Cl.
CPC .............. *H04W 4/14* (2013.01); *H04W 8/183* (2013.01); *H04W 80/04* (2013.01); *H04W 80/10* (2013.01)

(58) Field of Classification Search
CPC ....... H04W 4/14; H04W 8/183; H04W 80/04; H04W 80/10
See application file for complete search history.

(56) References Cited

U.S. PATENT DOCUMENTS

| | | | |
|---|---|---|---|
| 2015/0031356 A1* | 1/2015 | Gupta | H04W 8/02 455/433 |
| 2015/0154570 A1 | 6/2015 | Dheer | |
| 2019/0098487 A1* | 3/2019 | Boettger | H04W 8/183 |

FOREIGN PATENT DOCUMENTS

| | | |
|---|---|---|
| CN | 202713624 U | 1/2013 |
| CN | 103929520 A | 7/2014 |
| WO | 2015180138 A1 | 12/2015 |
| WO | 2018154570 A1 | 8/2018 |

OTHER PUBLICATIONS

English Abstract of CN202713624U.
English Abstract of CN103929520A.
International Search Report issued in the corresponding PCT Application, published as WO2020139288.

* cited by examiner

*Primary Examiner* — Wayne H Cai
(74) *Attorney, Agent, or Firm* — Ladas & Parry LLP

(57) ABSTRACT

The present invention relates to a system which enables users to use short message (SMS-short message service) capabilities of their mobile second numbers over a device wherein their first numbers are included without carrying an additional device by means of a mobile application (3) in a mobile IMS (IP Multimedia Subsystem) network.

16 Claims, 1 Drawing Sheet

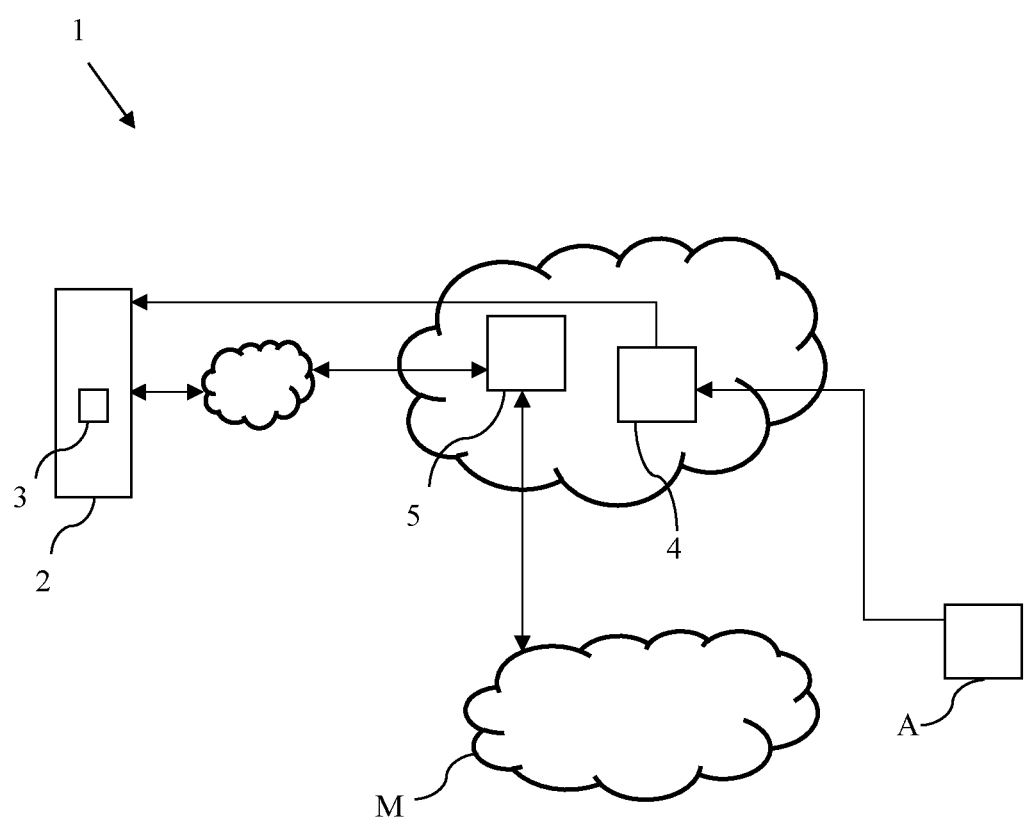

SYSTEM FOR SENDING SHORT MESSAGE OVER A SECOND NUMBER

This application is a national phase entry under 35 USC 371 of International Patent Application No. PCT/TR2019/051190 filed on 24 Dec. 2019, which claims the benefit of Turkish Patent Application No. 2018/20342 filed on 25 Dec. 2018, the entire contents of which are incorporated herein by reference.

TECHNICAL FIELD

The present invention relates to a system which enables users to use short message (SMS-short message service) capabilities of their mobile second numbers over a device wherein their first numbers are included without carrying an additional device by means of a mobile application in a mobile IMS (IP Multimedia Subsystem) network.

BACKGROUND OF THE INVENTION

Today, subscribers can get service on a mobile communication network by a plurality of numbers. In such cases, subscribers usually carry two mobile devices and answer incoming calls and SMS's over two different mobile devices or they carry out transaction by using their mobile devices separately when they will make call or send SMS. Today, it is possible to answer SMS's reaching the second number over the device where the SIM card of the first device is inserted by locating a SMS forwarding service before SMSC (Short Message Service Center) management unit on GSM network when it is desired to use SMS capabilities of two different lines. However, it is not possible for the first number to send SMS over the device where its SIM card is inserted by using a second number in this method. For this reason, there is need for solutions whereby it is possible to manage not only SMS's reaching the second numbers and also to manage SMS's outgoing from the device where SIM card of another number is inserted by using the second number.

The United States patent document no. US2015201086 discloses a system for providing a virtual phone application in order that phone services such as making, receiving call or sending sms are carried out by a different number on the same phone. In the invention, there is provided an internet enabled device i.e. able to communicate with other devices via the internet such as a phone, etc. configured for a virtual phone application. Here, a virtual phone number is assigned depending on a certain standard and the application provides regular telephony and communication services (receiving, answering call and sending sms) via VOIP. This communication system created comprises: a virtual phone application on the device configured to initiate a call request, a VoIP server configured to receive and analyze a dialed number of the call request from the device, a Session Border Controller (SBC) configured to receive the call request from the VoIP server. The virtual phone application is also capable of receiving an incoming call from any phone line. According to another embodiment of this invention, there is also provided a communication system for sending sms via this virtual phone application using a VoIP network between an internet enabled telephone device and any phone line. This communication system comprises: a virtual phone application configured to initiate a sms request, a web server configured to receive sms over a secure hyper text transfer protocol (http), a vector signal generator (VSG) configured to receive sms over transmission control protocol (TCP) from the web server, a sms gateway configured to receive sms over http, a sms center (SMSC) configured to receive sms to be sent to the recipient. The virtual phone application is also capable of receiving sms's incoming from any phone line.

The International patent document no. WO2018154570 discloses a system for creating a second virtual environment in a mobile device with a single sim-card and a main environment, according to which a second phone environment is created, so as to eliminate the need to use two physical phones. In this invention, a second phone number is added on the same smart phone module and the second environment is associated with new user accounts, such as emails and social applications. Also, the second added phone number is associated with text messaging accounts such as sms and WhatsApp. The system uses client software, a data base server, a direct inward dialing (DID) provider, an application server and a storage server. The server side contains sets of tables with end users information and transactions such as user phone number, e-mail, name, location of user's files in the storage, user configurations. The application server is responsible for: call initiation, receiving, call management, and quality of service. A mobile smartphone application is downloaded to the smartphone unit to add a second or more virtual environments to the physical environment of the smartphone and the user registers it to the application by creating a user profile. The second phone environment created over this application is associated with a new phone number. The user who has a new phone number and a virtual environment upon the application is downloaded and registered, can carry out all transactions in real operating system.

SUMMARY OF THE INVENTION

An objective of the present invention is to realize a system which enables users to use short message (SMS-short message service) capabilities of their mobile second numbers over a device wherein their first numbers are included without carrying an additional device by means of a mobile application in a mobile IMS network.

Another objective of the present invention is to realize a system wherein a second number of a user is connected to his/her first number over subscription systems by a mobile application created without requiring an additional hardware and software investment in a mobile IMS network and which enables the user to receive messages reaching his/her second number over a mobile application over the mobile device where the SIM card of the first device is inserted and/or to send message from his/her second number over the mobile device where the SIM card of the first device is inserted.

Another objective of the present invention is to realize a system which enables a mobile device user to use his/her two different numbers on a single device by a mobile application created without requiring an additional hardware and software investment in a mobile IMS network.

Another objective of the present invention is to realize a system whereby it is enabled to manage SMS's and a user can send and receive SMS by SIP (Session Initiation Protocol) technology in cases where there is no access to a mobile voice network but there is access to a Wi-Fi network.

Another objective of the present invention is to realize a system which enables to charge a user from a second number's operator without carrying out any transaction, in a case where s/he uses a second number.

DETAILED DESCRIPTION OF THE INVENTION

"A System for Sending Short Message over a Second Number" realized to fulfil the objectives of the present invention is shown in the figure attached, in which:

FIG. 1 is a schematic view of the inventive system for sending short message over a second number.

The components illustrated in the figure are individually numbered, where the numbers refer to the following:
1. System
2. Mobile device
3. Mobile application
4. Register unit
5. Signaling management unit
M: Mobile IMS network
A: Mobile network subscription systems The inventive system (1) for sending short message over a second number comprises:
- at least one mobile device (2) which receives mobile communication service by its SIM (subscriber identity module) card from a mobile communication network and which is configured to run at least one application on it;
- at least one mobile application (3) which can be run on the mobile device (2), carries message over internet protocol (IP) and uses SIP (session initiation protocol) signaling protocol for SMS transmission;
- at least one register unit (4) wherein a user is registered to the mobile application (3) by his/her first number identified in his/her SIM card inserted to his/her mobile device (2), and a second number and a first number are matched in mobile network subscription systems (A); and
- at least one signaling management unit (5) which communicates with the mobile IMS network (M), enables signaling management over a second number, enables the mobile application (3) to be registered to the mobile IMS network (M) by using the second number and to be included in life cycle of the mobile application (3), receives the SMS's transmitted towards the second number from the mobile IMS network (M), and/or transmits the messages sent by the user over the mobile application (3) by using his/her second number to the mobile IMS network (M).

In a preferred embodiment of the invention, the mobile device (2) is an electronic device such as mobile phone, smartphone, tablet computer that receives mobile communication service from a mobile communication network by means of SIM card and can run at least one mobile application (3) on it.

In the inventive system (1), the mobile application (3) contains a SIP client and connection between it and the management unit (5) is provided by SIP protocol. The mobile application (3) is registered to the signaling management unit (5) over the first number in the SIM card of the mobile device (2). The mobile application (3) carries out authentication and register transaction (SIP register) by using "SIP digest authentication" method with the first number, every time it is opened.

The mobile application (3) creates a new account by processing the second number information included in the information about the second number match that it receives from the register unit (4) after it carries out the authentication and register transaction for the first number. The mobile application (3) carries out the authentication and register transaction (SIP register) by using SIP digest authentication method for the second number information as well.

The mobile application (3) transmits message sending request of the user to the signaling management unit (5) by using standard methods specified in SIP signaling protocol over Internet protocol, by using his/her second number. The mobile application (3) ensures that a message is transmitted to the mobile IMS network (M) by the signaling management unit (5) and the mobile IMS network (M) transmits the message as SMS towards the transmitted number.

The mobile application (3) wherein the second number is registered receives the message request coming from the signaling management unit (5) being in communication with the mobile IMS network (M) as push notification (PN) by means of services provided by the operation system of the mobile device (2), when there is a SMS transfer to the second number. The user reads the SMS notification coming over the mobile application (3) and signaling flow is completed between the signaling management unit (5) and the mobile IMS network (M). When a number sends SMS towards a second number registered in the mobile application (3), the SMS is transmitted to the mobile IMS network (M) at first. The mobile IMS network (M) transmits the message sending request to the signaling management unit (5) in order to forward the received message to the client registered in it. The signaling management unit (5) sends the incoming message sending request as push notification request to the interfaces provided by the operation system of the mobile device (2), in order to transmit it to the mobile application (3) that has register in it with the second number.

In a preferred embodiment of the invention, the register unit (4) is a unit wherein a mobile network subscriber receives request for use of second number over communication channels such as website, SMS channel, call center provided by an operator, and a register transaction is carried out. The register unit (4) receives the first and second number information of the user by means of customized services that are determined by REST (representational state transfer) interfaces over HTTPS (hyper text transfer protocol secure) from mobile network subscription systems (A). The register unit (4) registers the match between the first number and the second number with reference to the second number definition request that it receives from the mobile network subscription system (A), in a database it owns and transmits the information comprising the second number information about the fact that the second number definition is made, to the mobile application (3) by push notification (PN). The push notification sent by the register unit (4) is sent by means of interface provided by the operation system of the mobile device (2) running on the mobile application (3).

In the inventive system (1), the signaling management unit (5) is a unit wherein the mobile application (3) registers to the mobile IMS network (M) by using the second number and it is ensured that the mobile application (3) remains as registered in the life cycle. The signaling management unit (5) enables the second number to remain in the mobile IMS network (M) as registered by register refresh. The signaling management unit (5) initiates the register status in the mobile IMS network (M) of the second number by subscription transaction. Changes in the register status a number in the mobile IMS network (M) are notified to units that are subscribed to the register status and the signaling management unit (5) receiving the notification renews the register transaction it is a notification that the register transaction is over.

With the inventive system (1), it is enabled to manage SMS's and a user can send and receive SMS by SIP (Session Initiation Protocol) technology in cases where there is no access to a mobile voice network but there is access to a Wi-Fi network. Also, a user is charged from a second number's operator without carrying out any transaction in a case where s/he uses his/her second number in the system (1).

Within these basic concepts; it is possible to develop various embodiments of the inventive system for sending short message over a second number (1); the invention cannot be limited to examples disclosed herein and it is essentially according to claims.

The invention claimed is:

1. A system (1) for sending short message over a second number comprising:
   a) at least one mobile device (2) which receives mobile communication service by its SIM (subscriber identity module) card from a mobile communication network and which is configured to run at least one application on it;
   b) at least one mobile application (3) which can be run on the mobile device (2), carries message over internet protocol (IP) and uses SIP (session initiation protocol) signaling protocol for SMS transmission wherein the mobile application (3) which carries out authentication and register transaction (SIP register) by using "SIP digest authentication" method with the first number, every time it is opened;
   c) at least one register unit (4) wherein a user is registered to the mobile application (3) by his/her first number identified in his/her SIM card inserted to his/her mobile device (2), and a second number and a first number are matched in mobile network subscription systems (A); and
   d) at least one signaling management unit (5) which communicates with the mobile IMS network (M), enables signaling management over a second number, enables the mobile application (3) to be registered to the mobile IMS network (M) by using the second number and to be included in life cycle of the mobile application (3), receives the SMS's transmitted towards the second number from the mobile IMS network (M), and/or transmits the messages sent by the user over the mobile application (3) by using his/her second number to the mobile IMS network (M) wherein the mobile application (3) which creates a new account by processing the second number information included in the information about the second number match that it receives from the register unit (4) after it carries out the authentication and register transaction for the first number.

2. The system (1) according to claim 1, wherein the mobile device (2) which is an electronic device that receives mobile communication service from a mobile communication network by means of SIM card and can run at least one mobile application (3) on it.

3. The system according to claim 2, wherein the electronic device is a mobile phone, smart phone or tablet computer.

4. The system (1) according to claim 1, wherein the mobile application (3) contains a SIP client, and wherein connection between it and the management unit (5) is provided by SIP protocol.

5. The system (1) according to claim 1, wherein the mobile application (3) is registered to the signaling management unit (5) over the first number in the SIM card of the mobile device (2).

6. The system (1) according to claim 1, wherein the mobile application (3) carries out the authentication and register transaction (SIP register) by using SIP digest authentication method for the second number information as well.

7. The system (1) according to claim 4, wherein the mobile application (3) which transmits message sending request of the user to the signaling management unit (5) by using standard methods specified in SIP signaling protocol over Internet protocol, by using his/her second number.

8. The system (1) according to claim 1, wherein the mobile application (3) which ensures that a message is transmitted to the mobile IMS network (M) by the signaling management unit (5) and the mobile IMS network (M) transmits the message as SMS towards the transmitted number.

9. The system (1) according to claim 1, wherein the mobile application (3) which receives the message request coming from the signaling management unit (5) being in communication with the mobile IMS network (M) as push notification (PN) by means of services provided by the operation system of the mobile device (2), when there is a SMS transfer to the second number.

10. The system (1) according to claim 1, wherein the register unit (4) wherein a mobile network subscriber receives request for use of second number over communication channels is carried out.

11. The system according to claim 10, wherein the communication channels are selected from a website, SMS channel and call center provided by an operator.

12. The system (1) according to claim 1, wherein the register unit (4) which receives the first and second number information of the user by means of customized services that are determined by REST (representational state transfer) interfaces over HTTPS (hyper text transfer protocol secure) from mobile network subscription systems (A).

13. The system (1) according to claim 1, wherein the register unit (4) which registers the match between the first number and the second number with reference to the second number definition request that it receives from the mobile network subscription system (A), in a database it owns and transmits the information comprising the second number information about the fact that the second number definition is made, to the mobile application (3) by push notification (PN).

14. The system (1) according to claim 1, wherein the signaling management unit (5) wherein the mobile application (3) registers to the mobile IMS network (M) by using the second number and it is ensured that the mobile application (3) remains as registered in the life cycle.

15. The system (1) according to claim 1, wherein the signaling management unit (5) which enables the second number to remain in the mobile IMS network (M) as registered by register refresh.

16. The system (1) according to claim 1, wherein the signaling management unit (5) which initiates the register status in the mobile IMS network (M) of the second number by subscription transaction.

* * * * *